INVENTOR.
Paul Kollsman

INVENTOR.
Paul Kollsman
BY Howard G. Russell
his ATTORNEY

Feb. 3, 1959

P. KOLLSMAN 2,872,407

APPARATUS FOR MODIFYING THE CHEMICAL COMPOSITION
OF FLUIDS BY ION TRANSFER

Filed April 17, 1957

INVENTOR.
Paul Kollsman

BY Howard E. Russell
his ATTORNEY

United States Patent Office 2,872,407
Patented Feb. 3, 1959

2,872,407

APPARATUS FOR MODIFYING THE CHEMICAL COMPOSITION OF FLUIDS BY ION TRANSFER

Paul Kollsman, New York, N. Y.

Application April 17, 1957, Serial No. 653,311

15 Claims. (Cl. 204—301)

This invention relates to the art of modifying the chemical composition of substances by a transfer of ions under the influence of a suitable bias, such as an electric current, or by hydrostatic pressure in a process commonly called dialysis.

The principle underlying ion transfer is the fact that compounds in solution, for example salt in water, split into charged atomic or molecular particles. These charged particles can be caused to move in a controlled fashion under the influence of a bias, for example an impressed electrical potential which may conveniently be created between a positively charged anode and a negatively charged cathode. The negatively charged particles tend to travel towards the anode and are called anions for this reason and the positively charged particles are attracted by the cathode and are called cations.

Means are known for selectively influencing, restricting, controlling, or impeding the movement of ions. Substances are known which, when formed into a thin wall or membrane, are effective fluid barriers adapted to separate fluid volumes from one another, but which permit anions to pass therethrough while obstructing the passage of cations, and other substances are known which may be shaped into membranes effective as fluid barriers but capable of permitting cations to pass therethrough while restricting the passage of anions.

It is thus possible, for example, to reduce the salt content of saline solutions by causing ions of the salt to pass from one chamber containing the solution through appropriate ion-passage-discriminating membranes or wall portions into other chambers, thus removing from the solution the salt it originally contained.

The present invention provides improvements and refinements of apparatus for ion transfer making the apparatus more economical and more efficient.

The present invention is based on the discovery that it is not absolutely necessary to employ anion-permeable cation-passage-resistant fluid barriers and cation-permeable, anion-passage resistant fluid barriers throughout the ion exchange apparatus, but, that it is possible, even advantageous, to substitute certain neutral fluid barriers which are permeable to both anions and cations for certain inherently selective fluid barriers which are passage resistant to either anions or cations. The invention is further based on the discovery that the desired result of selective ion transfer is not impaired by such substitution, but that certain forces are brought into play which produce a result comparable to that previously produced by the selectivity of certain fluid barriers.

The present invention, among numerous other applications, is admirably suited for the treatment and purification of water to convert raw salt water such as naturally occurring brackish water into fresh water for agricultural and industrial uses, and even for human consumption as drinking water. However, the invention is not limited to such applications but may be employed with equal advantage in the production of new compositions from constituents found in a plurality of source compounds entering the process.

Thus, the invention has broader uses and applications and is particularly suited for the production of certain commercially important and relatively expensive chemical compositions from other compositions which are cheaper and more abundantly available. In many instances these processes are carried out under influence of an electric current, yet without the presence of electrodes in the chambers in which the treatment takes place. In this manner certain undesirable reactions are eliminated which would occur at the electrodes, if electrodes were physically present in the oxidation and reduction chambers. In other instances a pressure bias is employed instead of an electric bias.

This specification is a continuation in part of the specification of my earlier copending application Serial No. 217,638, filed March 26, 1951, now abandoned, entitled "Method of and Apparatus for Modifying the Chemical Composition of Fluids by Ion Transfer," about to be abandoned without abandoning the invention disclosed therein.

The various objects, features and advantages of this invention will appear more fully from the detailed description which follows, accompanied by drawings, showing, for the purpose of illustration, apparatus for practicing the invention.

The invention also consists in certain new and original features of construction and combination of parts, as well as of steps and combination of steps, as hereinafter set forth and claimed.

Although the characteristic features of this invention which are believed to be novel will be particularly pointed out in the claims appended hereto, the invention itself, its objects and advantages, and the manner in which it may be carried out will be better understood by referring to the following description taken in connection with the accompanying drawings forming a part of it, in which:

Figure 1:
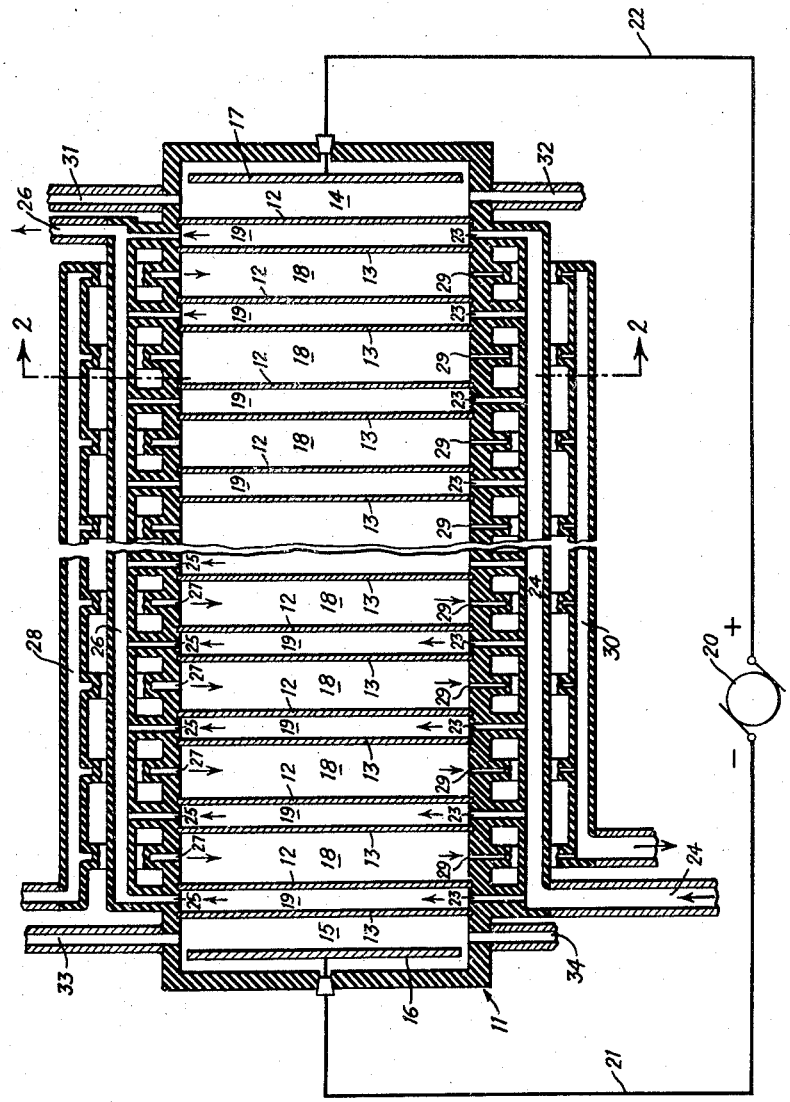
Figure 1 is a diagrammatic representation, in vertical cross-section, of an improved apparatus embodying the present invention and adapted to carry out the improved method disclosed herein.

In the following description and in the claims, various details will be identified by specific names for convenience. The names, however, are intended to be as generic in their application as the art will permit. Like reference characters refer to like parts in the several figures of the drawings.

In the drawings accompanying and forming a part of this specification, certain specific disclosure of the invention is made for the purpose of explanation of broader aspects of the invention, but it is understood that the details may be modified in various respects without departure from the principles of the invention and that the invention may be applied to, and practiced by, other structures than the ones shown.

The principles and features of the invention are readily understood by first considering the basic structure of an apparatus for practicing it. Figure 1 is a diagrammatic illustration of an apparatus particularly designed for increasing and decreasing the salinity of water by ion transfer, but it may be used for the treatment or production of other fluids and compositions.

A tank 11 is subdivided into a plurality of chambers or cells by fluid separating ion permeable walls or membranes composed of a suitable composition or material imparting to the walls or membranes ion discriminating characteristics. Thus, certain membranes 13 are inherently cation-permeable and anion-passage-resistant. However, the membranes 12 do not necessarily have to have the opposite characteristics of being anion-permeable and cation-passage-resistant, as was the practice prior to this invention, but may be less strongly biased, so as to be permeable to both anions and cations. For the sake of convenience the membranes 12 will sometimes also be referred to as "neutral" membranes. The membranes are arranged in alternating sequence with respect to traverse of the tank from one end to the other so that a cation-permeable, anion-passage-resistant membrane follows a neutral membrane 12 and is, in turn, followed by a cation-permeable, anion-passage-resistant membrane 13 and so forth.

The chamber of cells may be classified into two terminal chambers 14 and 15 containing electrodes 16 and 17, and a plurality of intermediate chambers 18 and 19.

The electrode 16 is connected to the negative pole of a source of electric energy 20 by a lead 21 thus becoming a cathode, and the electrode 17 is connected to the positive pole of a source 20 by a lead 22 making the electrode 17 an anode. The intermediate chambers 18 may conveniently be termed concentration chambers, and the intermediate cells 19 may be called dilution chambers, according to the character of the ionic action taking place therein.

The dilution chambers 19 are preferably narrower than the concentration chambers 18, width being measured between the bordering membranes.

Speaking first of the chambers 19, the chambers have inlet ports 23 at, or near, the bottom admitting fluid into the dilution chambers from an inlet duct 24 which is suitably manifolded with respect to all the dilution chambers.

An outlet port 25 is provided at, or near, the top of each dilution chamber and leads to an outlet duct 26.

The concentration chambers 18 have a supply port 27 at or near the top, manifolded with respect to a supply duct 28, and a restricted discharge port 29 provides for the withdrawal of fluid from a point near the bottom of the concentration chambers into a discharge duct 30.

Separate ducts 31, 32, 33 and 34 are preferably provided for the terminal chambers 14 and 15 for the supply of fluid to the terminal chambers and the withdrawal therefrom. The fluid of the terminal chambers is preferably handled separately because of certain electro-chemical reactions which may be induced by the physical presence of the electrodes in these chambers, making it generally undesirable to mix the fluid of the terminal chambers with the fluid of the dilution chambers or of the concentration chambers.

In certain instances it may even be advisable to provide for separate handling of the fluid leaving the chambers immediately adjacent the terminal chambers by providing separate outlet and discharge facilities for them.

From the arrangement of the ports and ducts it is evident that the direction of flow through the dilution chambers is upwards, or opposed to gravitation, while the direction of flow through the concentration chambers is opposed to the flow through the dilution chambers and is downward, following gravity.

The supply of fluid through the inlet duct 24 is such that the fluid passes through the dilution chambers at a predetermined controlled slow rate which is so maintained as to insure a predetermined degree of dilution, by reason of ion depletion, to take place within the chambers.

The supply, and particularly the discharge or withdrawal of fluid from the concentration chambers may be maintained at a fraction of the total volumetric flow passing through the dilution chambers. This is preferably accomplished by installation of flow restrictions which may be restricted capillary passages 29, as illustrated.

Since ion transfer processes involve a transfer of liquid through the membranes, it is convenient to compare the volumetric flows through the dilution chambers and through the concentration chambers by reference to the volume entering the dilution chambers and the volume leaving the concentration chambers. Thus the volume of the fluid entering the dilution chambers includes that portion of fluid which permeates the membrane of the dilution chambers, and the volume withdrawn from the concentration chambers includes the fluid gain by reason of passage of fluid into the concentration chambers through its membranes.

The operation of the apparatus may be conveniently explained by a specific example. It may be assumed that the apparatus is being used for the reduction of the salt content of saline water and the simultaneous production of salt water of a higher concentration.

When the operation of the device in connection with water purification is understood, it will easily be seen how other compounds in solution may be treated in the apparatus.

It may be assumed that an electrical potential is applied to the electrodes at the time salt-containing raw water enters through the inlet duct 24. The raw water was preferably filtered to free it from mechanical impurities, and is substantially evenly distributed over the dilution chambers 19 through which it slowly flows in the direction opposed to gravity.

Assuming, for reasons of simplicity, that the only salt present in the raw water is sodium chloride, the positively charged sodium cations are attracted by the cathode 16 and tend to travel toward it. The sodium cations pass through the cation-permeable membranes 13 and accumulate in the concentration chambers 18.

Similarly, the chlorine anions pass through the anion-permeable neutral membrane 12 and accumulate in the concentration chambers 18.

The sodium and chlorine ions which migrated into the concentration chambers cause the salt concentration in the chambers 18 to increase, while simultaneously the salt concentration in the dilution chambers 19 decreases.

In devices proposed prior to the present invention, the membranes corresponding to the membranes 12 of the present apparatus were made of a material having the property of resisting the passage of cations. The present invention is based on the discovery that it is not necessary to employ membranes passage-resistant with respect to ions of one sign and to employ other membranes passage-resistant to ions of the opposite sign, but that a neutral membrane may take the place of a passage-resistant membrane without impairing the efficiency of the process.

Without limiting the present invention, or its merits, by the possible incorrectness of the theory of its operation, it appears reasonable—although it has not been definitely ascertained—to ascribe the result of achieving satisfactory ion selectivity to the tendency of the fluids to remain ionically balanced. Assuming, for example, that a sodium cation is withdrawn through a cation-permeable, anion passage resistant membrane 13 and enters the volume of fluid in a concentration chamber 18, the fluid in the chamber 18 becomes ionically unbalanced unless a chlorine anion enters it simultaneously through the neutral membrane 12. The corresponding chlorine anion enters the chamber 18 under the influence of the applied electrical bias, more particularly under the action of the anode toward which the chlorine anion tends to travel.

The sodium cation which originated in a dilution chamber 19 and passed through a cation-permeable anion-passage-resistant membrane 13 into the adjoining concentration chamber 18, does not leave the chamber 18, even though the next membrane which the sodium cation would encounter is not cation-passage-resistant, but is neutral. The sodium cation remains in the chamber 18 because of the simultaneous passage into the chamber 18 of chlorine anions. At this point it may be well to observe that the chlorine anions entering a concentration chamber 18 are unable to leave it because of the anion-passage-resisting property of the membrane 13 which the anions would encounter at leaving the chamber 18. Thus the presence of the anions in the chamber tends to confine a corresponding number of cations in the chamber 18 in such a way that ionic balance is maintained.

Due to the tendency of each volume of fluid to maintain its ionic balance, in effect a selective ion transfer is accomplished even though certain membranes are neutral, i. e. permeable to ions of both signs, and not inherently ion selective in the strict sense of the word.

The economic advantages of employing neutral membranes is considerable. Depending on the particular nature of the reactions taking place in the respective chambers, it may be found, for example, that membranes which are passage-resistant to ions of one sign have a longer life, or are more efficient, or have a higher electric conductivity, or are cheaper or more abundantly available than membranes which are passage-resistant to ions of the opposite sign. In such a case it is advantageous to substitute neutral membranes for the membranes passage-resistant to ions of the opposite sign, if such neutral membranes are superior to the membranes they are to replace.

It is also frequently found, for example, that a neutral membrane of a certain material is less affected by the chemical composition of the fluids with which it is in contact than the ion passage-resistant membrane it replaces. It may also be that a neutral membrane has greater physical strength than the ion passage-resistant membrane it replaces, which is of a particular advantage in installations in which certain hydrostatic pressure differences occur, are likely to occur, or in which hydrostatic pressure is employed as a bias to initiate the transfer of ions as will be set forth in greater detail further below.

Returning now to the illustrated apparatus it is seen that purified water is present at the top of the concentration chambers 18. The purification of water flowing through the dilution chambers may therefore be carried to a high degree, and water leaving through the outlet ports 25 has a particularly high degree of purity.

The flow through the concentration chambers takes place at a volumetric rate which is only a fraction of the volumetric rate of flow through the dilution chambers. For this reason the salt enrichment per volumetric unit of fluid in the concentration chambers reaches a higher degree than the salt depletion in the dilution chambers. Assuming, for example, that the volumetric flow through the concentration chambers is one-sixth of the volumetric flow through the dilution chambers, it is evident that the concentration taking place in the concentration chambers is six times as great per volumetric unit of fluid as the loss of salt in the dilution chambers so that the water leaving the concentration chambers through the discharge ports contains six times the amount of salt as the sea water entering the dilution chambers.

Better economy is achieved due to the fact that the fluid in the chambers 18 offers little resistance to electric current because of the high concentration by reason of the reduced volumetric rate of flow.

The volumetric rate of flow through the dilution chambers 19 may be controlled either by control of the fluid pressure or by the dimensions of the ports 23, or both, in such a way that the fluid leaving the device through the outlet duct 26 has the desired degree of dilution, and the volumetric flow through the concentration chambers is so controlled, as to maintain the ion enrichment at a predetermined ratio with respect to the ion depletion in the adjoining chambers.

A particular feature of the counterflow arrangement of the illustrated apparatus is its favorable effect on the current density and distribution. It is evidently desirable to have the greatest current density near the bottom of the chambers in order to remove the greatest possible number of ions per unit of time from the flow entering the dilution chambers. A high current density near the bottom of the chambers is promoted by the concentration chambers in which the greatest concentration and hence, the greatest conductivity is likewise near the bottom, and not near the top as it would be in an installation which does not employ the principle of opposite flow on opposite sides of the membranes.

Fluid may enter and leave the terminal chambers in any desired direction. The ducts 31 to 33 may be inflow ducts and the ducts 32 and 34 may be discharge ducts, in which event the flow through the terminal cells would also be opposed to the direction of flow in the dilution chambers adjoining them. Nevertheless, the flow through the terminal cells may be reversed, if this should be desirable.

Figure 3:
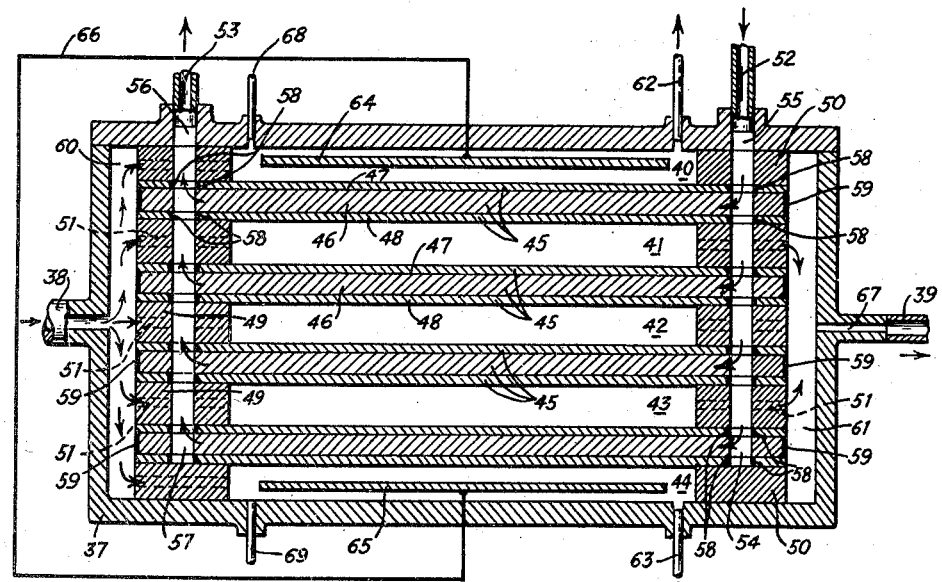
Figure 3 is a diagrammatic representation, in cross-section, of an apparatus embodying the present invention and operating on the pressure bias principle.
Figure 4:
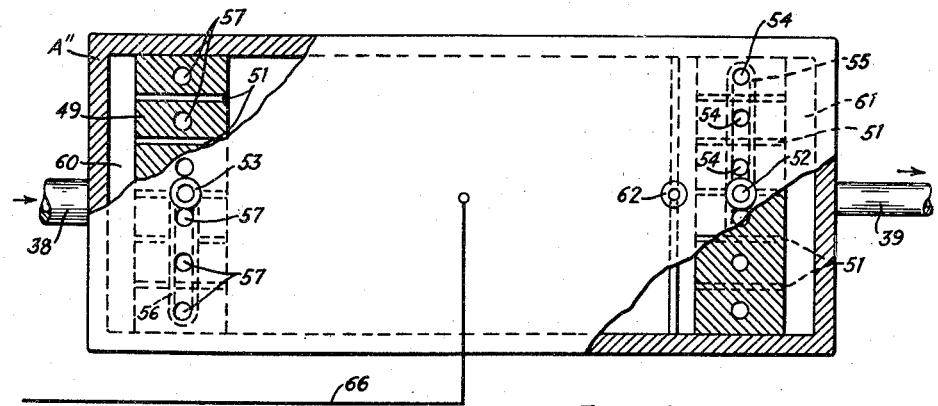
Figure 4 is an end view of the apparatus shown in Figure 3, portions of the wall shown broken away.

In Figures 3 and 4 the invention is shown as applied to a dialyzer operating on the pressure bias principle. The apparatus comprises a pressure resistant fluid tight housing 37 having an inlet duct 38 and an outlet duct 39. The interior space of the housing is subdivided into a plurality of chambers 40, 41, 42, 43 and 44 by partitions 45. Each partition comprises a central core lamination 46 of a porous rigid or flexible compression resistant material and face laminations 47 and 48 of cation-permeable, anion-passage-resistant material, and of neutral anion-permeable and cation-permeable material, respectively. It is obvious, however, that anion-permeable, cation-passage-resistant material may be used for one of the laminations and neutral material for the other.

The partitions 45 are separated by spacers 49 and 50. The spacers 49 have passages 51 therethrough through which fluid may enter, and through which fluid may leave, the chambers 40, 41, 42, 43 and 44. Other spacers 50 have no such passages for reasons which will become apparent.

A supply duct 52 supplies fluid to the core laminations and a discharge duct 53 discharges concentrate from the core laminations. The supply duct 52 is manifolded with respect to individual ducts 54 by a manifold duct 55 in the housing. In a similar manner the discharge duct 53 is manifolded by a manifold duct 56 with respect to a plurality of individual discharge ducts 57.

The individual supply ducts 54 are formed by registering apertures in the laminations 46, 47, 48 and the spacers 49 and 50 which lie adjacent the end chamber 61. The individual discharge ducts 57 are formed by similar apertures in the laminations 46, 47, 48 and the spacers 49 and 50 lying adjacent the end chamber 60.

The ion discriminating face laminations 47 and 48 are sealed with respect to the individual supply and discharge ducts 54 and 57, as shown at 58, and the porous core laminations are sealed at 59 at their marginal edges to prevent entry of fluid into the core lamination from the chambers 60 and 61 into which the ducts 38 and 39 extend. The side edges of the partitions extend from wall to wall of the housing and are sealed with respect thereto.

Separate discharge passages 62 and 63 are provided for the withdrawal of fluid from the terminal chambers 40 and 41 for reasons which will become apparent hereinafter. Electrodes 64 and 65 may be arranged in the terminal chambers 40 and 41, the electrodes being connected by a lead 66. As will later be seen, the electrodes are not biasing electrodes but may be omitted.

The operation of the apparatus is substantially as follows: Fluid to be deionized is supplied under pressure through the inlet duct 38 and enters the inlet chamber 60 of the housing. It then flows through the passages 51 in the spacers into the several chambers 40, 41, 42, 43 and 44, thus exerting an equal amount of pressure to both sides of the three-ply partitions 45. The partitions thus are relieved from one-sided pressure, since the force acting on one ion-discriminating face lamination is transmitted through the porous rigid core 46 to the opposite neutral face lamination on which an equal, but oppositely directed pressure acts.

The face laminations 47 and 48 are of a microporous structure to permit the passage of ions therethrough, the width of the pores being of the order of the size of the ions which the pores should permit to pass through, and into, the porous structure of the core. The core structure is macroporous, relatively speaking, that is to say that its pore size may be considerably larger. Porcelain, earthenware and ceramics with or without internal flow resistance reducing channels serve well as core materials. Porous material of natural or synthetic resin or rubber are also suitable, the principal requirements being sufficient compression resistance to the operating pressure, chemical inertness and sufficient physical strength to prevent damage in handling of individual cores.

Figure 5:
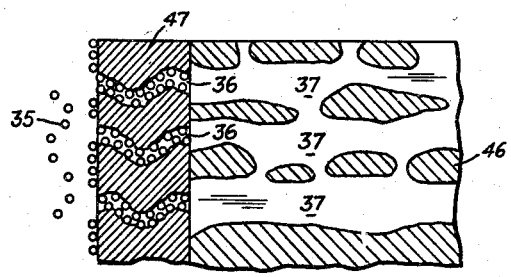
Figure 5 is a schematic illustration, in the nature of a cross-section, illustrating structure and operation of the ion-passage-discriminating members of the device shown in Figures 3 and 4.

In Figure 5 the ions are represented by small spheres 35 and the pores in the coating and in the core are indicated at 36 and 37 respectively. It may be assumed that the illustrated ions are ions of one sign and that the coating material which forms the face lamination has the inherent property of adsorbing the ions which cling to its surface and fill its pores 36. The hydrostatic pressure tends to dislodge the adsorbed ions in the film pores into the core, where they pass into the volume of fluid supplied to the core, for example, through the duct 52 or by the fluid entering through the film pores 36 together with the ions. The fluid in the core 46 is thus enriched with ions of one sign which becomes ionically unbalanced and tends to capture a corresponding number of ions of the opposite sign from the next chamber through the neutral lamination 48 through which ions of the opposite sign pass with preference because of the enrichment of the core fluid with ions of the one sign.

The fluid flowing through the chambers is thus depleted of ions and leaves the intermediate chambers 41, 42 and 43 through passages 51 in the spacers at the other end of the chambers, then enters the common outlet chamber 61 and flows into the outlet duct 39 which may include a flow restricting member, for example, a capillary 67 to maintain a certain hydrostatic pressure in the chambers.

Anions reaching a core lamination through a face lamination from one chamber combine with cations entering the same core lamination through the other face lamination from the next chamber or cell and form a concentrate which then leaves the apparatus through ducts 57, manifold duct 56 and discharge ducts 53.

With the possible exception of the terminal partitions bordering the terminal chambers 40 and 44, equivalent amounts of ions pass into the core laminations from both sides.

Speaking of the terminal chambers, it is apparent that the fluid in the cells 40 and 44 is depleted of solution anions and cations respectively, so that there remains a surplus of such cations in the chamber 40 and a surplus of such anions in the chamber 44. Separate ducts 62 and 63 are provided to prevent mixing of thte products of the terminal chambers with the products of the intermediate chambers.

Nevertheless, if desired, the same mean pH may also be maintained in the terminal chambers by addition of a fluid containing Cl anions and Na cations. Such fluid may be introduced through ducts 68 and 69.

The transfer of ions through the several ion discriminating combinations causes a potential to be built up tending to oppose the transfer of ions. This potential may be diminished by the electrodes 64 and 65 connected to each other by the lead 66.

Figures 3 and 4 must be considered as largely diagrammatic particularly with respect to the dimensions, some of which are enlarged and others reduced for the sake of clearness. In an actual installation the partitions are closely spaced, spaces of between 1 to 3 millimeters being particularly advantageous. Also the partition area is much larger than illustrated. The number of chambers is considerably greater than shown, so that the relative influence of the terminal chambers is negligible with respect to the total production.

The apparatus shown in Figures 3 and 4 may be operated in such a position that the partitions 45 are substantially vertical, the fluid to be deionized entering through the duct 38 at the bottom and leaving through the duct 39 at the top. In this position an automatic flow control is operative which influences the volumetric rate of flow through the various cells in accordance with the specific gravity of the fluid. Assuming, for example, that the fluid in chamber 41 has a higher mean specific gravity than the fluid in chamber 42, the higher specific gravity will tend to slow the flow through the chamber 41 as compared to the flow through the chamber 42. As a consequence the fluid in the chamber 41 is exposed to the dialyzing action for a longer period of time than the flow in the neighboring chamber, causing the change in ion concentration to proceed at a faster rate than in the chamber 42. As the specific gravity of the fluid in the chamber 41 is reduced as the result of the change in ion concentration, the flow velocity increases.

In this manner automatic control over the branch flows through the several chambers is attainable in a relatively simple way. A similar control is operative in some measure in the core laminations where the specific gravity also influences the rate of flow through the respective cores, provided that the porosity of the cores is such as to prevent relatively little flow resistance to the rather slow flow of fluid therethrough.

As was previously mentioned, a neutral membrane may take the place either of an anion-permeable, cation-passage-resistant membrane or of a cation-permeable, anion-passage-resistant membrane. For the purpose of simplifying the explanation of the present invention, the above described forms of apparatus were described as containing neutral membranes and membranes passage-resistant to ions of one sign or of the opposite sign.

As will now be shown, neutral membranes may take the place of certain anion-passage-resistant membranes, and other neutral membranes may take the place of cation-passage-resistant membranes in the same apparatus so that, in effect, three types of membranes are present in the same apparatus, namely anion-passage-resistant membranes, cation-passage-resistant membranes, and neutral membranes. As will be seen from the following examples, the number of neutral membranes exceeds the number of inherently ion-passage-selective membranes, so that the advantage is gained of substituting neutral membranes for at least half of the inherently passage-selective membranes.

The combinations or arrangements in which the membranes can be arranged are numerous and include arrangements in which neutral membranes alternate with inherently ion-passage selective membranes, as well as arrangements in which pairs of neutral membranes alternate with ion-passage selective membranes, so that for example each ion-passage-selective membrane is followed by two neutral membranes.

Figure 6:
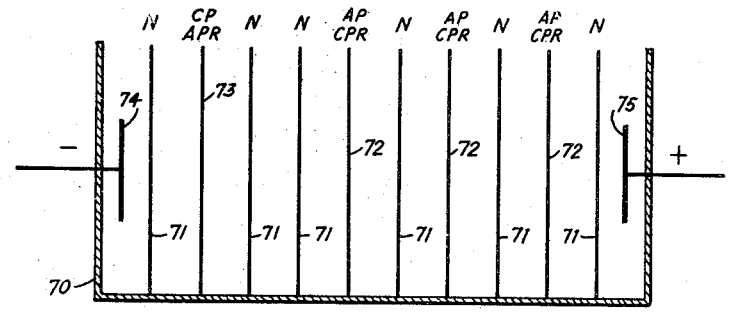
Figures 6 and 7 are diagrammatic illustrations of apparatus employing modified membrane arrangements.

In Figure 6 an arrangement is shown in which a housing 70 contains neutral membranes 71 as well as anion-permeable, cation-passage-resistant membranes 72 and a cation-permeable, anion-passage resistant membrane 73. The electrodes are indicated at 74 and 75, but no fluid ducts are shown for reasons of simplicity.

Figure 7:
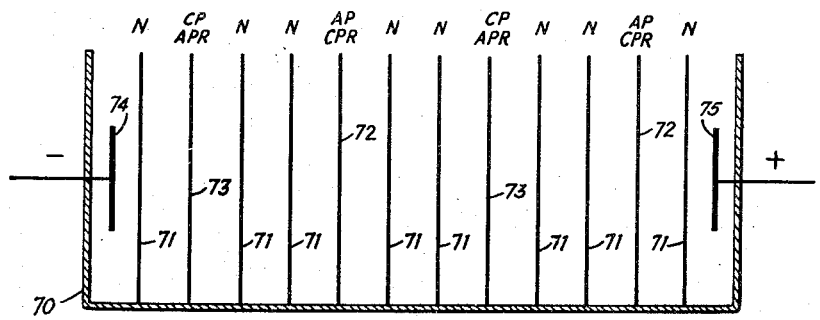

Figure 7 shows an installation where a housing 76 contains anion-pereable, cation-passage-resistant membranes 72, cation-permeable, anion-passage-resistant membranes 73, and neutral membranes 71 which in several places are arranged in pairs. The electrodes are shown at 74 and 75.

It is noteworthy that the terminal chambers in which the electrodes lie are sealed by neutral membranes in the arrangement of Figure 6 and Figure 7. This is a particularly advantageous arrangement in instances where electrochemical reactions produced at the electrodes would tend to reduce the life of inherently ion-passage selective membranes in the terminal chambers. There being a wide choice of materials suited as neutral membranes, it is relatively easy to select inexpensive, durable neutral membranes for the terminal chambers.

It was previously mentioned that the tendency of the fluid volumes to remain ionically balanced operates to control the passage of ions through the neutral membranes. For a similar reason an ion-passage selective membrane of higher efficiency tends to offset the lower efficiency of another membrane in the same apparatus by preventing, indirectly, an undesired passage of ions of a certain sign through a low-efficiency membrane even though the low efficiency membrane were physically capable per se, and not in the illustrated arrangement, to permit a certain number of ions to pass therethrough which it was designed to exclude.

In the forms of apparatus illustrated in Figures 1 to 7 the ion passage selective membranes or surfaces and the neutral membranes or surfaces generally were found on opposite walls of a chamber. This of course is not necessary since the ion passage selective surfaces as well as the neutral surfaces may form elements of one and the same major wall surface. Thus a single membrane may have certain surface portions permeable to ions of one sign and passage resistant to ions of the opposite sign, and other surface portions passage resistant to ions of both signs, or, at least, of passage restricting characteristics inferior to those of the selective surface portions. Wall structures having two distinct types of surface portions are disclosed in my copending application Serial No. 178,384, filed August 9, 1950, now abandoned, and its continuation-in-part Serial No. 535,946, filed September 22, 1955.

Figure 8:
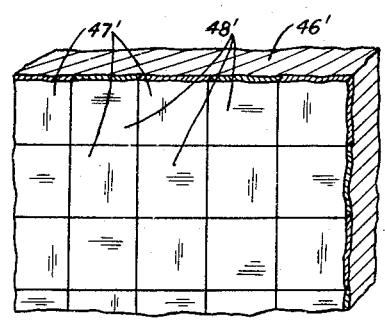

Figure 8 illustrates a wall construction comprising a microporous core structure 46' on which surface portions 47' and 48' are superimposed in checkerboard fashion. The surface portions 47' are permeable to ions of one sign and passage-resistant to ions of the opposite sign, whereas the surface portions 48' are permeable to ions of both signs, or at least less passage selective than the surface portions 47', said surface portions having also been referred to as "neutral."

Figure 9:
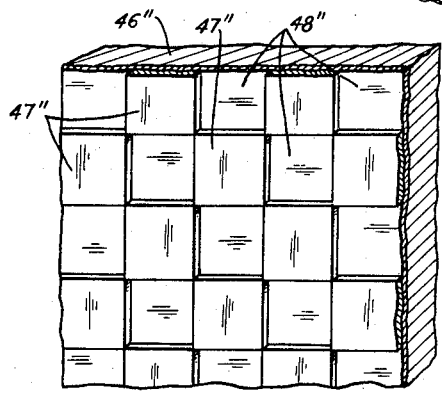
Figures 8 and 9 are perspective views, on an enlarged scale, of membranes having surface portions of different ion passage restrictive properties.

Figure 9 illustrates a wall construction which is particularly advantageous from a manufacturing standpoint. The microporous core structure 46" carries a surface coating or lamination 48" of a neutral character, permeable to ions of both signs. Ion passage selective surface portions 47", passage resistant to ions of one sign or of the opposite sign are superimposed on the lamination 48", for example by printing them thereon. The resulting wall structure resembles that of Figure 8 except that the structure shown on Figure 9 has elevated portions 47" extending beyond the surface of the lamination 48".

Membrane materials suitable for the practice of the invention have been known for many years. In 1940 Meyer and Straus disclosed the manufacture and performance of anion membranes and cation membranes in volume 23 of Helvetica Chimica Acta, pp. 795 to 800.

The cation membranes are essentially dyed cellophane membranes and the anion membranes are treated "Naturin" membranes, "Naturin" being an artificially produced collogen sheet material made from animal hides and commercially marketed by C. Freudenberg, Weinheim, Germany, and its present successor, Naturin Werk, Becker & Co., Weinheim, Germany.

The process of making this sheet material is disclosed in the United States Patent 2,114,220 to Freudenberg and Becker, which issued on April 12, 1938.

The treatment of the cellophane and "Naturin" sheet material is described in detail by Meyer and Straus and produces satisfactory permselective membranes of stated performance figures. Such membranes were duplicated by me on the basis of Meyer and Straus' disclosure and produced good permselective membranes meeting Meyer and Straus' stated performance figures. The membranes were successfully used in the desalting of brackish waters, as are abundantly available in the southwestern part of the United States, having a concentration of the order of 1500 parts per million.

Other suitable membranes may be made by intimately mixing a synthetic ion exchange with an electrically insulating and chemically inert bonding material, the latter being a well known plastic, and molding the mixture into the desired shape.

The ion exchange properties of certain synthetic resins were discovered as early as 1935, as reported by F. C. Nachod in his book "Ion Exchange" on page 319. On pages 385 to 387 Nachod lists commercially available cation exchangers and anion exchangers and states their essential chemical composition.

The synthesis of a typical cationic phenolformaldehyde sulphonic acid type resin is described on page 48 by Nachod and the synthesis of an anion exchange resin from monomeric amines by polymerization is disclosed on page 64.

Another standard textbook, Kunin and Meyers' "Ion Exchange Resins," published by Wyllie and Sons in 1950, discloses the synthesis of cation exchangers on page 54 and the synthesis of anion exchangers on page 57.

In an article on permselective membranes in the Journal of Physical and Colloid Chemistry, Wyllie discloses specifically the manufacture of cation membranes and states that the principles remain unchanged for membranes having fixed positive charges, i. e. anion membranes. Wyllie produced cation membranes containing Amberlite IR–100 which is listed by Nachod as being a phenol-formaldehyde sulphonic acid type resin.

The principal purpose for which Wyllie produced the permselective membranes was the investigation of ion activities. This is one of the two principal purposes for which permselective membranes are usually employed, the other use being the selective transfer of ions in electrodialysis apparatus.

This was common knowledge prior to the filing of my original application and is apparent, for example, from the article by C. Kalauch in Kolloid Zeitschrift, vol. 12, 1949, pp. 21 to 26. Similar disclosure is found in the article by Sollner in vol. 97, No. 7 of the Journal of the Electrochemical Society, July 1950, pp. 139C, 148C and 152C. Meyer and Straus also disclose the two uses of which permselective membranes are capable in reporting on the results obtained by dialysis and on the results obtained by measuring concentration potentials.

Wyllie discloses the composition of molded membranes having a wide range of ohmic resistance, the low range being particularly suitable to dialysis, a preferred composition of the membrane being 70 parts of ion exchange resin and 30 parts of a binder by weight.

In order to test my invention I manufactured such permselective membranes following Wyllie's disclosure and employing air dried Amberlite which, according to Wyllie's statement, contains approximately 20% to 30% water of the oven dried weight of bone dry Amberlite.

I independently determined the water content and obtained figures ranging from 27% to 33% at relative humidities of 59% and 92%, respectively. The water content of air dried Amberlite is considerably in excess of the minimum of 15% believed critical for practical permselective membranes by some workers in the field.

A. Tests conducted with Wyllie membranes

I manufactured Wyllie type membranes for test purposes as follows:

Granules of Amberlite IR-120 in Na form of a size passing a 100 mesh sieve were mixed with polystyrene granules of 200 mesh size in a ratio of 70 parts Amberlite and 30 parts polystyrene. The mixture was then molded under a pressure of 3000 lbs. per square inch maintained at 140° C. for one minute, resulting in a cation membrane of 1 mm. thickness.

In the manufacture of anion membranes I employed the same procedure using Amberlite IRA-400 granules passing the 100 mesh sieve. The resulting anion membranes were 1.5 mm. thick.

Amberlite cation membranes were combined with neutral cellophane membranes having a thickness of 0.1 mm. to construct a 9-compartment apparatus comprising, in this order, a cathode—a neutral membrane—a cation membrane—a neutral membrane—a cation membrane—a neutral membrane—a cation membrane—a neutral membrane—a cation membrane—an anode. Each membrane had an exposed surface of 25 x 100 mm. The following results were produced:

*Test A-1.*—Flow in all compartments upward. Solution of 1 g. of NaCl in 1000 cc. of water supplied to all compartments. Current 100 ma., time 60 minutes. Electrode compartment flow (compartments Nos. 1 and 9) 3500 cc. per hour. Dilute outflow from compartments Nos. 3, 5 and 7, 261 cc. containing 102 mg. NaCl. Concentrate outflow from compartments Nos. 2, 4, 6 and 8, 336 cc. containing 591 mg. of NaCl.

Summary of concentrations:
 Dilute _____ 0.39 g. NaCl per 1000 cc.
 Concentrate _____ 1.76 g. NaCl per 1000 cc.

*Test A-2.*—Counterflow. Flow through concentration compartments (Nos. 2, 4, 6, 8) downward; flow through dilution compartments (Nos. 3, 5, 7) upward; flow through electrode compartments (Nos. 1 and 9) upward at the rate of 3500 cc. per hour. Dilute outflow divided into two branches, one branch constituting the net dilute outflow, the other branch constituting liquid supply for the concentration compartments.

*Results.*—Net dilute outflow 161 cc. containing 26 mg. of NaCl. Concentrate outflow 119 cc. containing 313 mg. of NaCl.

Summary of concentrations:
 Dilute _____ 0.161 g. NaCl per 1000 cc.
 Concentrate _____ 2.63 g. NaCl per 1000 cc.

Amberlite anion membranes were combined with neutral cellophane membranes of a thickness of 0.1 mm. to construct a 9-compartment apparatus comprising, in this order, an anode—a neutral membrane—an anion membrane—a neutral membrane—an anion membrane—a neutral membrane—an anion membrane—a neutral membrane—an anion membrane—a cathode. The exposed membrane surace was 25 x 100 mm. for each membrane, the anion membranes were 1.5 mm. thick.

*Test A-3.*—Counterflow. Flow through concentration compartments (Nos. 2, 4, 6 and 8) downward; flow through dilution compartments (Nos. 3, 5 and 7) upward; flow through electrode compartments (Nos. 1 and 9) upward.

Solution was supplied containing 0.95 g. NaCl and 0.05 g. $K_2SO_4$ per 1000 cc. of water. Current 100 ma.; time 60 minutes. Flows: Through electrode compartments 3500 cc. per hours. Dilute outflow from compartments 3, 5 and 7, 260 cc. per hour containing 89 mg. NaCl and $K_2SO_4$; concentrate outflows from compartments 2, 4, 6 and 8, 335 cc. per hour containing 604 mg. NaCl and $K_2SO_4$.

Summary of concentrations:
 Dilute _____ 0.342 g. of salts per 1000 cc.
 Concentrate _____ 1.81 g. of salts per 1000 cc.

*Test A-4.*—Counterflow with reflux. Flow through concentration compartments (Nos. 2, 4, 6 and 8) downward; flow through dilution compartments (Nos. 3, 5 and 7) upward; flow through electrode compartments (Nos. 1 and 9) upward at the rate of 3500 cc. per hour. Dilute outflow divided into two branches, one branch constituting the net dilute outflow, the other branch constituting liquid supply for the concentration compartments.

*Results.*—Net dilute outflow 158 cc. containing 29 mg. of salt. Concentrate outflow 122 cc. containing 307 mg. NaCl and $K_2SO_4$.

The dilute is disproportionately more depleted of K cations and the concentrate is disproportionately more enriched in K cations relative to the total ion depletion and enrichment of the liquids respectively, indicating a fractionation of ions of like polarity.

Summary of concentrations:
 Dilute _____ 0.183 g. of salts per 1000 cc.
 Concentrate _____ 2.52 g. of salts per 1000 cc.

*Test A-5.*—The apparatus of test A-3 was modified by placing directly over the anion membranes within the concentration compartments 2, 4, 6 and 8 a sheet of cellophane of 0.1 mm. thickness. The sheet was maintained in contact with the anion membranes by a slight hydrostatic overpressure of 10 mm. water column with respect to the pressure prevailing at the dilute outflow.

Flow through concentration compartments (Nos. 2, 4, 6 and 8) downward; flow through dilution compartments (Nos. 3, 5 and 7) upward.

Solution was supplied containing 0.95 g. NaCl and 0.05 g. $K_2SO_4$ per 1000 cc. of water. Current 120 ma.; time 60 minutes. Flows: Through electrode compartments 3500 cc. per hour. Dilute outflow from compartments 3, 5 and 7, 277 cc. per hours containing 74 mg. of salts; concentrate outflows from compartments 2, 4, 6 and 8, 324 cc. per hour containing 617 mg. of salts.

Summary of concentrations:
 Dilute _____ 0.276 g. of salts per 1000 cc.
 Concentrate _____ 1.918 g. of salts per 1000 cc.

The improved performance with respect to test A-3 appears to be the result of the reduction of hydraulic leakage across the permselective anion membranes by the cellophane sheets placed thereon. Since the cellophane sheets lie in the concentrate, their ohmic resistance is so small as to be negligible for practical purposes.

B. Tests conducted with Meyer and Straus membranes

For the purpose of comparative performance tests three different types of electrodialysis apparatus were constructed as follows:

Each apparatus contained a total of 13 compartments including 2 electrode compartments and 11 intermediate compartments, the individual compartments being formed by 6 membranes of one kind and 6 membranes of another kind, arranged in alternatnig order. The vertically disposed membranes were spaced 3 mm. and the exposed area of each membrane was 100 mm. high and 40 mm. wide. Platinum electrodes were mounted in the end compartments. The specific structural differences between the three forms of apparatus were as follows:

Apparatus 1 was fitted with alternating membranes of cellophane (neutral membranes) and cellophane dyed with Chloranthin-Lichtbraun BRLL (cation membranes). The sequence from left to right was: cathode, neutral membrane, cation membrane, neutral membrane, cation membrane, etc.

Apparatus 2 was fitted with alternating membranes of cellophane (neutral membranes) and treated Naturin membranes (anion membranes). The Naturin was obtained from the successor of C. Freudenberg, Naturin Werk, Becker & Co., Weinheim, Germany, and was methylated according to directions by Meyer and Straus to produce anion membranes. The sequence from left to right was: anode, neutral membrane, anion membrane, neutral membrane, anion membrane, etc.

Figure 2:
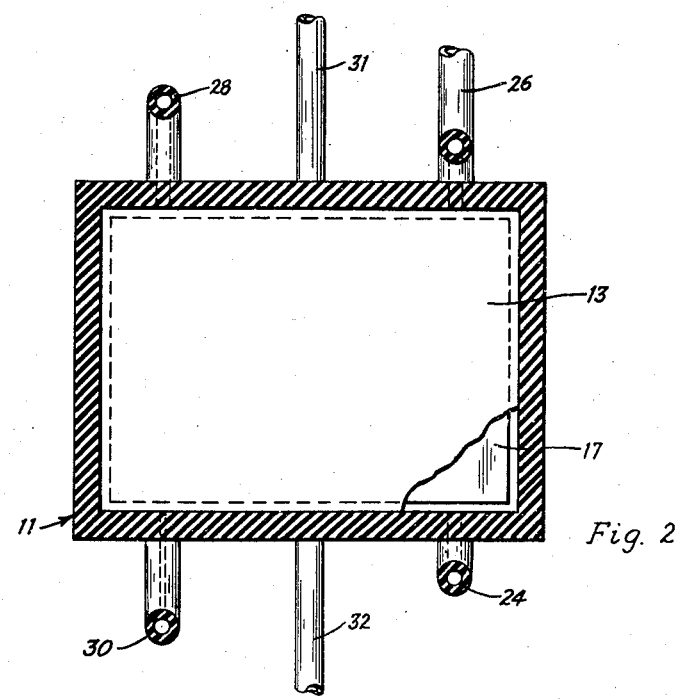
Figure 2 is an elevational view taken on line 2—2 of Figure 1.

Apparatus 3 was fitted with alternating membranes of cellophane dyed with Chloranthin-Lichtbraun BRLL and methylated Naturin membranes, the arrangement disclosed by Meyer and Straus and illustrated in Figure 2 by Meyer and Straus.

For the purpose of the tests an aqueous NaCl solution was prepared of approximately 250 p. p. m. concentration and a specific resistivity of 2600 ohms. Each compartment, including the electrode compartments, was filled to one-half of its volumetric capacity with the solution and identical tests were conducted as follows:

A current of 40 ma. was passed through the apparatus for 15 minutes causing ionic concentration and ionic dilution to take place in alternating intermediate compartments. The contents of the dilution compartments were then removed, mixed, and the resistivity measured. Similarly, the contents of the concentration compartments were removed, mixed, and the resistivity measured. The following results were obtained:

*Apparatus 1 (neutral membranes alternating with cation membranes).*—Resistivity of the liquid in the dilution compartments—6350 ohms. Resistivity of the liquid in the concentration compartments—1640 ohms.

*Apparatus 2 (neutral membranes alternating with anion membranes).*—Resistivity of the liquid in the dilution compartments—6050 ohms. Resistivity of the liquid in the concentration compartments—1730 ohms.

*Apparatus 3 (alternating permselective membranes as disclosed by Meyer and Straus).*—Resistivity of the liquid in the dilution compartments—8450 ohms. Resistivity of the liquid in the concentration compartments—1580 ohms.

A further test was conducted to compare the performance of membranes used in the tests with the membranes tested by Meyer and traus. For this purpose four different membrane samples were subjected to a potential measurement with 0.02 KCl solution on one side and 0.01 KCl solution on the other side.

For the cation membranes the following potentials were measured: plus 10.5 mv.; plus 11.2 mv.; plus 10.2 mv.; plus 11.7 mv. By way of comparison, Meyer and Straus report plus 11.0 mv.

The anion membranes were subjected to the same test and the following potentials were measured: minus 11.8 mv.; minus 11.6 mv.; minus 11.9 mv.; minus 11.5 mv. By way of comparison, Meyer and Straus report minus 12.0 mv.

The permselectivity test established that the selectivity and performance of the used membranes approximate very closely the selectivity and performance of the original Meyer and Straus membrane.

The tests 1 and 2 prove conclusively that it is practical to obtain ionic concentration and ionic dilution in an electrodialysis apparatus in which either the cation membranes or the anion membranes are replaced by neutral membranes.

The invention thus provides for greater simplicity, efficiency and economy of apparatus for ion transfer.

The invention also provides a method for the selective transfer of ions from one volume of fluid into another without the use between the fluids of a membrane which is permeable to ions of one sign and passage resistant to ions of the opposite sign. According to the invention a selective transfer of ions is effected by ionically unbalancing a volume of fluid so that the fluid seeks to regain its ionic balance by either expelling ions of which there is a surplus or by withdrawing from another volume ions of which there is a deficiency in the one volume.

Evidently the invention may be applied to, and practiced by, various forms of apparatus and is not limited to the specific devices illustrated in the drawings. Likewise, many kinds of chemical compositions may be decomposed, recomposed or transformed by treatment according to the invention.

In this connection ions of compositions may even be replaced by larger electrically charged particles of colloidal size by treatment in the described forms of apparatus.

Thus numerous changes, additions, omissions, substitutions and modifications in the apparatus, as well as other applications of the apparatus may be made without departing from the spirit, the teaching and the principles of the invention.

What is claimed is:

1. An apparatus for ionically concentrating and deionizing liquids by ion transfer, the apparatus comprising, means forming a plurality of chambers in excess of four, the chambers being arranged side-by-side; liquid separating ion permeable membranes between adjacent chambers for establishing a path for ions from one chamber into an adjacent chamber under the influence of an electric bias, alternating membranes being selectively permeable in the sense that they are permeable to ions of one sign and passage-resistant to ions of the opposite sign, and at least certain of the remaining membranes being neutral in the sense that they are permeable to ions of both signs; an electrode in each of the terminal chambers, one electrode serving as an anode, the other electrode serving as a cathode; means for supplying liquid to said chambers; and means for withdrawing liquid from said chambers.

2. An apparatus for ionically concentrating and deionizing liquids by ion transfer, the apparatus comprising, means forming a plurality of chambers in excess of four, the chambers being arranged side-by-side; liquid separating ion permeable membranes between adjacent chambers for establishing a path for ions of one chamber into an adjacent chamber under the influence of an electric bias, alternating membranes being cation-permeable and anion-passage-resistant, and at least certain of the remaining membranes being permeable to both anions and cations; an electrode in each of the terminal chambers, one electrode serving as an anode, the other electrode serving as a cathode; means for supplying liquid to said chambers; and means for withdrawing liquid from said chambers.

3. An apparatus for ionically concentrating and deionizing fluids by ion transfer, the apparatus comprising, means forming a plurality of chambers in excess of four, the chambers being arranged side-by-side; fluid separating ion permeable membranes between adjacent chambers for establishing a path for ions from one chamber into an adjacent chamber under the influence of a bias, alternating membranes being selectively permeable in the sense that they are permeable to ions of one sign and passage-resistant to ions of the opposite sign, and at least certain of the remaining membranes being neutral in the sense that they are permeable to ions of both signs; means for supplying fluid to said chambers; means for withdrawing fluid from said chambers; and means for maintaining a higher fluid pressure in certain chambers than in other chambers adjoining said certain chambers and separated therefrom by membranes, thereby establishing a pressure bias tending to cause migration of ions from chambers of higher pressure to chambers of lower pressure.

4. An apparatus for ionically concentrating and deionizing fluids by ion transfer, the apparatus comprising, means forming a plurality of chambers in excess of four, the chambers being arranged side-by-side; fluid separating ion permeable membranes between adjacent chambers for establishing a path for ions from one chamber into an adjacent chamber under the influence of a bias, alternating membranes being cation-permeable and anion-passage-resistant, and at least certain of the remaining membranes being permeable to both anions and cations; means for supplying fluid to said chambers; means for withdrawing fluid from said chambers; and means for maintaining a higher fluid pressure in certain chambers than in other chambers adjoining said certain chambers and separated therefrom by membranes, thereby establishing a pressure bias tending to cause migration of ions from chambers of higher pressure to chambers of lower pressure.

5. An apparatus for ionically concentrating and deionizing liquids by ion transfer, the apparatus comprising, means forming a plurality of chambers in excess of four, the chambers being arranged side-by-side; liquid separating ion permeable membranes between adjacent chambers for establishing a path for ions from one chamber into an adjacent chamber under the influence of a bias, alternating membranes being selectively permeable in the sense that they are permeable to ions of one sign and passage-resistant to ions of the opposite sign, and at least certain of the remaining membranes being neutral in the sense that they are permeable to ions of both signs; means for passing a flow of liquid to be deionized through certain alternate chambers; means for passing a flow of liquid to be ionically concentrated through certain other chambers lying between said alternate chambers, the flow through other chambers being substantially opposed to the flow through said alternate chambers; and means for establishing a bias to effect a migration of ions from said alternate chambers to said other chambers.

6. An apparatus for ionically concentrating and deionizing liquids by ion transfer, the apparatus comprising, means forming a plurality of chambers in excess of four, the chambers being arranged side-by-side; liquid separating ion permeable membranes between adjacent chambers for establishing a path for ions from one chamber into an adjacent chamber under the influence of a bias, alternating membranes being cation-permeable and anion-passage-resistant, and at least certain of the remaining membranes being neutral in the sense that they are permeable to both anions and cations; means for passing a flow of liquid to be deionized through certain alternate chambers; means for passing a flow of liquid to be ionically concentrated through certain other chambers lying between said alternate chambers, the flow through said other chambers being substantially opposed to the flow through said alternate chambers; and means for establishing a bias to effect a migration of ions from said alternate chambers to said other chambers.

7. An apparatus for ionically concentrating and deionizing liquids by ion transfer, the apparatus comprising, means forming a plurality of chambers in excess of four, the chambers being arranged side-by-side; liquid separating ion permeable membranes between adjacent chambers for establishing a path for ions from one chamber into an adjacent chamber under the influence of an electric bias, alternating membranes being selectively permeable in the sense that they are permeable to ions of one sign and passage-resistant to ions of the opposite sign, and at least certain of the remaining membranes being neutral in the sense that they are permeable to ions of both signs; means for passing a flow of liquid to be deionized through certain alternate chambers; means for passing a flow of liquid to be ionically concentrated through certain other chambers lying between said alternate chambers, the flow through said other chambers being substantially opposed to the flow through said alternate chambers; and an electrode in each of the terminal chambers, one electrode serving as an anode, the other electrode serving as a cathode.

8. An apparatus for ionically concentrating and deionizing liquid by ion transfer, the apparatus comprising, means forming a plurality of chambers in excess of four, the chambers being arranged side-by-side; liquid separating ion permeable membranes between adjacent chambers for establishing a path for ions from one chamber into an adjacent chamber under the influence of an electric bias, alternating membranes being cation-permeable and anion-passage-resistant, and at least certain of the remaining membranes being neutral in the sense that they are permeable to both anions and cations; means for passing a flow of liquid to be deionized through certain alternate chambers; means for passing a flow of liquid to be ionically concentrated through certain other chambers lying between said alternate chambers, the flow through said other chambers being substantially opposed to the flow through said alternate chambers; and an electrode in each of the terminal chambers, one electrode serving as an anode, the other electrode serving as a cathode.

9. An apparatus for ionically concentrating and deionizing liquids by ion transfer, comprising means forming a plurality of chambers in excess of four, the chambers being arranged side-by-side, and liquid separating ion permeable membranes between adjacent chambers for establishing a path for ions from one chamber into an adjacent chamber under the influence of a bias, alternating membranes being permeable to ions of one sign and the remaining membranes being permeable to ions of the opposite sign, and means for establishing a bias to drive ions from certain chambers through bordering membranes into other chambers, characterized in that more than half of the membranes are inherently neutral in the sense that they per se are permeable to anions and cations, the remaining membranes being inherently selective in the sense that they are permeable to ions of one sign and passage-resistant to ions of the opposite sign, and permeable to ions of the opposite sign and passage-resistant to ions of the one sign, respectively.

10. An apparatus for ionically concentrating and deionizing liquids by ion transfer, comprising means forming a plurality of chambers in excess of four, the chambers being arranged side-by-side, such chambers being concentration chambers and dilution chambers in alternating sequence, liquid separating ion permeable membranes lying between adjacent chambers for establishing a path for ions from one chamber into an adjacent chamber under the influence of a bias, and means for establishing a bias to drive ions from certain chambers through bordering membranes into other chambers, characterized in that more than half of the membranes are inherently neutral in the sense that they per se are permeable to anions and cations, the remaining membranes being inherently selective in the sense that they are permeable to ions of one sign and passage-resistant to ions of the opposite sign, and permeable to ions of the opposite sign and passage-resistant to ions of the one sign, respectively.

11. An apparatus for ionically concentrating and deionizing fluids by ion transfer, the apparatus comprising means forming a plurality of compartments; fluid separating ion permeable membrane walls between said compartments, said walls being exposed to the fluid in said compartments and furnishing a path for ions from one compartment into an adjoining compartment, certain membrane wall areas being permeable to ions of one sign and passage resistant to ions of the opposite sign, and other wall areas being neutral in the sense that they are permeable to ions of both signs; means for supplying fluid to and withdrawing fluid from said compartments; and means for maintaining a pressure difference on opposite sides of the membrane walls sufficient to drive ions from a compartment of lower ionic concentration through a membrane into a compartment of higher ionic concentration.

12. An apparatus for ionically concentrating and deionizing liquids by ion transfer, the apparatus comprising, means forming a plurality of chambers in excess of four, the chambers being arranged side-by-side; liquid separating ion permeable membranes between adjacent chambers for establishing a path for ions from one chamber into an adjacent chamber under the influence of a bias, alternating membranes being selectively permeable in the sense that they are permeable to ions of one sign and passage-resistant to ions of the opposite sign, and at least certain of the remaining membranes being neutral in the sense that they are permeable to ions of both signs; means for passing a flow of liquid to be deionized through certain non-adjacent chambers; means for passing a flow of liquid through the remaining chambers; and means for establishing a bias to move ions from certain chambers into adjoining chambers through said membranes.

13. An apparatus for ionically concentrating and deionizing liquids by ion transfer, the apparatus comprising means forming a plurality of chambers in excess of four, the chambers being arranged side-by-side; liquid separating ion permeable membranes between adjacent chambers for establishing a path for ions from one chamber into an adjacent chamber under the influence of a bias, alternating membranes being cation-permeable and anion-passage-resistant, and at least certain of the remaining membranes being neutral in the sense that they are permeable to both anions and cations; means for passing a flow of liquid to be deionized through alternate chambers; means for passing a flow of liquid to be ionically concentrated through other chambers; and means for establishing a bias to move ions from certain chambers into adjoining chambers through said membranes.

14. An apparatus for ionically concentrating and deionizing liquids by ion transfer, the apparatus comprising means forming a plurality of chambers in excess of four, the chambers being arranged side-by-side; liquid separating ion permeable membranes between adjacent chambers for establishing a path for ions from one chamber into an adjacent chamber under the influence of a bias, alternating membranes being anion-permeable and cation-passage-resistant, and at least certain of the remaining membranes being neutral in the sense that they are permeable to both anions and cations; means for passing a flow of liquid to be deionized through alternate chambers; means for passing a flow of liquid to be ionically concentrated through other chambers; and means for establishing a bias to move ions from certain chambers into adjoining chambers through said membranes.

15. An apparatus for ionically concentrating and deionizing liquids by ion transfer, the apparatus comprising, means forming a plurality of chambers in excess of four, the chambers being arranged side-by-side; liquid separating ion permeable membranes between adjacent chambers for establishing a path for ions from one chamber into an adjacent chamber under the influence of a bias, spaced membranes being permselective in the sense that they are permeable to ions of one sign and passage-resistant to ions of the opposite sign, and at least one further membrane between certain pairs of successive permselective membranes, said further membranes being neutral in the sense that they are permeable to ions of both signs; means for passing a flow of liquid to be deionized through certain non-adjacent chambers; means for passing a flow of liquid through the remaining chambers; and means for establishing a bias to move ions from certain chambers into adjoining chambers through said membranes.

References Cited in the file of this patent

UNITED STATES PATENTS 2,758,965    Block     Aug. 14, 1956

OTHER REFERENCES

Sollner: Journal of Electro Chem. Soc., vol. 97, No. 7, July 1950, pages 139C–151C.